United States Patent [19]
Takemori et al.

[11] Patent Number: 6,099,886
[45] Date of Patent: Aug. 8, 2000

[54] MOLDED FILAMENTARY MESH-STRUCTURED CHOCOLATE AND METHOD OF PRODUCING THE SAME

[75] Inventors: Toshio Takemori, Tokyo; Masahiro Takaga, Saitama; Masanori Ito, Saitama; Takayuki Manako, Saitama, all of Japan

[73] Assignee: Lotte Co., Ltd., Tokyo, Japan

[21] Appl. No.: 09/201,144

[22] Filed: Nov. 30, 1998

[30] Foreign Application Priority Data

Nov. 29, 1997 [JP] Japan ..................................... 9-343926

[51] Int. Cl.⁷ ....................................................... A23P 1/12
[52] U.S. Cl. ............................ 426/515; 426/516; 426/517
[58] Field of Search ................................... 426/515, 516, 426/517, 631

[56] References Cited

U.S. PATENT DOCUMENTS

| | | | |
|---|---|---|---|
| 3,307,503 | 3/1967 | Elmer, Jr. et al. ...................... | 426/516 |
| 4,045,583 | 8/1977 | Jeffery et al. ............................ | 426/241 |
| 4,421,773 | 12/1983 | Akutagawa .............................. | 426/249 |
| 4,426,402 | 1/1984 | Kaupert .................................... | 426/515 |
| 5,126,157 | 6/1992 | Burwell et al. .......................... | 426/516 |
| 5,129,315 | 7/1992 | Burwell et al. .......................... | 99/450 |
| 5,460,847 | 10/1995 | Kawabata et al. ...................... | 426/631 |

FOREIGN PATENT DOCUMENTS 0 321 449 A2   9/1988   European Pat. Off. .

*Primary Examiner*—Milton Cano
*Assistant Examiner*—Sherry A. Dauerman
*Attorney, Agent, or Firm*—Young & Thompson

[57] ABSTRACT

A novel filamentary mesh-structured chocolate comprises multilevel parallel-extending multi-filament structured layers, each of which further comprises a plurality of chocolate material straight filaments extending in parallel to each other to form a parallel-extending multi-filament structured layer, wherein adjacent two different level layers of the multilevel filament-structured layers are different from each other in the direction along which the chocolate material straight filaments extend so that each of the chocolate material straight filaments of the upper level one of the adjacent two different level layers is point-contacted with and crosses each of the chocolate material straight filaments of the lower level one of the adjacent two different level layers, thereby forming a three-dimensional internal space defined by the chocolate straight material filaments, wherein the chocolate material straight filaments are made of a chocolate material including an emulsifier.

15 Claims, 1 Drawing Sheet

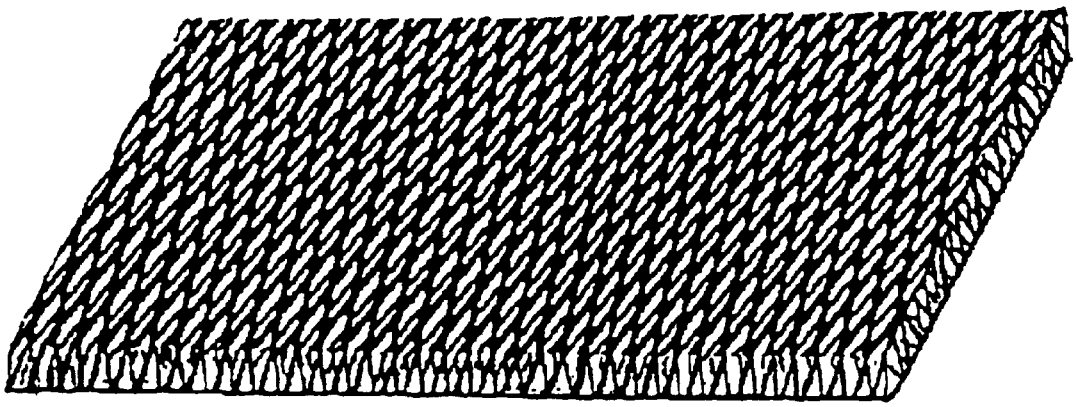

MOLDED FILAMENTARY MESH-STRUCTURED CHOCOLATE AND METHOD OF PRODUCING THE SAME

BACKGROUND OF THE INVENTION

Field of the Invention

The present invention relates to a chocolate, and more particularly to a molded filamentary mesh-structured chocolate which provides a light taste or light feeling in the mouth, and a method of producing the same.

PRIOR ART

Traditional molded chocolates have been produced by pouring a chocolate material into a mold and then removing the molded chocolate from the mold after cooling. The resulting chocolates were non-cellular solid materials and thus has a heavy and highly-seasoned taste.

Chocolate have been required to have a light taste in compliance with the recent tendency toward lightening of dietary habits and tastes.

There had been developed a molded chocolate containing a number of air-cells, which has been produced by pouring a chocolate material into a mold and then expanding the material under a reduced pressure to form air-cells inside the molded chocolate as disclosed in Japanese Laid-open Patent Publication No. 52-39141. Such chocolate, however, had a insufficiently low volume of the air-cells for reducing heavy and highly-seasoned tastes.

In Japanese Patent No. 2580017, it is disclosed that a molded chocolate comprising a plurality of chocolate filaments, wherein the filaments extend in non-parallel to one another to cross each other so that the filaments are piled up and partially adhered to one another. Since adjacent chocolate filaments are overlapped with each other, an internal air-space of the molded chocolate is only about 25%. This low internal air-space volume is insufficient for providing the required light taste with reducing the heavy and highly-seasoned tastes.

In Japanese Laid-open Patent Publication No. 9-9870, it is disclosed that a molded chocolate has a number of small internal air-spaces formed by so curled chocolate material strings as to form small spheres by paired dies, whereby the strings are piled up without such adhesion with each other as to form a bulk free of any internal air-space. In addition, the above publication also discloses a molded chocolate having a generally spherical shape which has been produced as follows. A chocolate material is first prepared from 29.5–34 wt % of oils and fats and 0.3–0.6 wt % of a sugar ester having an HLB of 5–10 for subsequent addition with 0.3–1.5 wt % of water, so that the chocolate material is extruded from an extruder to shape the chocolate material into strings, before the chocolate material strings are filled into the dies, whereby the chocolate material strings are complicatedly inter-curled to form a large number of small internal air-spaces. However, this molded chocolate has a small total volume of the small internal air-spaces as being complicatedly inter-curled and piled up. This chocolate further has such a high water content as providing poor melting property in mouth, resulting in a problem in quality of the chocolate.

It has also been proposed to form a filamentary mesh-structured chocolate without, however, using the mold. Namely, a first set of plural first level chocolate filaments are extruded from nozzles and then dropped onto a moving belt thereby to form first level chocolate filaments extending in parallel to each other. Thereafter, a direction of the nozzle is changed to further extrude a second set of plural second level chocolate filaments onto the first level chocolate filaments so as to form second level chocolate filaments extending in parallel to each other but to make an angel with reference to the first level chocolate filaments. The above processes are repeated to form multi-level chocolate filament layers, wherein directions of the chocolate filaments are different between adjacent level chocolate filaments and are the same between alternately different level chocolate filaments. This multi-level filament layered chocolate is cooled to cut the same in a predetermined size. Side portions of the multi-level filament layered chocolate are, however, so fragile that the multi-level filament layered chocolate is deformed in shape or fractured to form fracture pieces upon cutting the same or during transportation. Such fracture pieces of the chocolate may be adhered onto a hand or hands of a person who is about to eats the chocolate, thereby significantly reducing the commercial value thereof.

Thus, it is difficult for the conventional molded chocolates to form a sufficiently large total volume of small internal air-spaces for providing an improved taste with the required light feeling in the mouth and reduced heavy and highly-seasoned tastes.

It is also difficult for the other conventional strings-structured chocolate produced by the extruder to form a sufficiently large total volume of internal air-spaces for providing an improved taste with the required light feeling in the mouth and reduced heavy and highly-seasoned tastes because the chocolate strings as extruded from the nozzles are likely to be adhered with each other to form a internal space free bulk chocolate. In order to prevent such problem, it is necessary to cool the chocolate strings immediately after when chocolate strings have been extruded from the nozzle, however, reducing a gloss of a surface of the chocolate product, resulting in an unattractive chocolate product. Further problem is blocking the nozzles in use, resulting in significantly decrease in the efficiency of the manufacturing. If water is included into the chocolate material, then the chocolate product is very poor in melting property in the mouth.

If the chocolate product is formed without use of molding technique, then the chocolate product is so fragile as likely to be deformed in shape thereof or fractured.

In the above circumstances, it had been required to develop a novel filamentary mesh-structured chocolate formed by molding a chocolate material so that the filamentary mesh-structured chocolate products are free from the problems as described above.

SUMMARY OF THE INVENTION

It is an object of the present invention to provide a novel filamentary mesh-structured chocolate having a multilevel filament layered structure which forms sufficiently large internal air-spaces for providing the required light taste or light feeling in the mouth, wherein filaments in two adjacent different levels are point-contracted with other, without forming an internal air space free bulk, even the novel filamentary mesh-structured chocolate is non-fragile and hard to be deformed or fractured.

It is another object of the invention to provide a method of producing a novel filamentary mesh-structured chocolate having a multilevel filament layered structure which forms sufficiently large internal air-spaces for providing the required light taste or light feeling in the mouth, wherein filaments in two adjacent different levels are point-contacted with other, without forming an internal air space free bulk, even the novel filamentary mesh-structured chocolate is non-fragile and hard to be deformed or fractured.

The present invention provides a novel filamentary mesh-structured chocolate comprising multilevel parallel-extending multi-filament structured layers, each of which further comprises a plurality of chocolate material straight filaments extending in parallel to each other to form a parallel-extending multi-filament structured layer, wherein adjacent two different level layers of the multilevel filament-structured layers are different from each other in direction along which the chocolate material straight filaments extend so that each of the chocolate material straight filaments of upper level one of the adjacent two different level layers is point-contacted with and crosses each of the chocolate material straight filaments of lower level one of the adjacent two different level layers, thereby forming a three-dimensional internal space defined by the chocolate material straight filaments. The pitch of the chocolate material straight filaments in the same level layer may either be variable or preferably substantially constant or regular.

It is also preferable that alternately different level layers of the multilevel filament-structured layers are identical with each other in direction along which the chocolate material straight filaments extend.

The above novel filamentary mesh-structured chocolate has a large fracture strength which makes the chocolate free from a deformation, fracture or cracking even the above novel filamentary mesh-structured chocolate has a sufficiently large ratio in volume of the internal three-dimensional space to the chocolate material straight filaments for providing a light taste and a light feeling in the mouth.

As described above, it is important for the present invention to prevent the chocolate material straight filaments from being united with each other due to deformations thereof and also keep the above three-dimensional straight-filament mesh structure forming the sufficiently large internal three-dimensional space for providing a light taste and a light feeling in the mouth, an emulsifier may be used for the chocolate material, wherein the emulsifier is added at 0.3–5 wt %, preferably 1–3 wt % based on the total weight of the chocolate material, and the emulsifier comprises at least one selected from the group consisting of sorbitan-tristearate, sorbitan-trioleate, sorbitan-monooleate, hexaglycerol-monostearate and decaglycerol-monooleate. Optionally, it is also effective to use the above emulsifier at 0.3–5 wt %, preferably 1–3 wt % in combination with lecithin for the chocolate material.

The present invention also provides a method of producing the above novel filamentary mesh-structured chocolate. A chocolate material is prepared which includes, with or without lecithin, an emulsifier at 0.3–5 wt %, preferably 1–3 wt % based on the total weight of the chocolate material, wherein the emulsifier comprises at least one selected from the group consisting of sorbitan-tristearate, sorbitan-trioleate, sorbitan-monooleate, hexaglycerol-monostearate and decaglycerol-monooleate. A depositor having a plurality of extrusion nozzles is moved in a straight line in a first direction in relation to a mold together with extrusions of the chocolate material from the extrusion nozzles so that a plurality of first level chocolate material straight filaments extending over the mold in parallel to each other and in the first direction to form a first level parallel-extending multi-filament structured layer, and subsequently the depositor is then moved in a straight line in a second direction which is different from the first direction by an angle in the range of more than 0 degree to less than 180 degrees with further extrusions of the chocolate material from the extrusion nozzles so that a plurality of second level chocolate material straight filaments extending in parallel to each other and in the second direction to form a second level parallel-extending multi-filament structured layer over the first level parallel-extending multi-filament structured layer, wherein each of the second level chocolate material straight filaments is point-contacted with and crosses each of the first level chocolate material straight filaments. The above operations will repeat to fill the mold with multilevel parallel-extending multi-filament structured layers thereby forming a three-dimensional internal space defined by the chocolate material straight filaments, before cooling the mold to bring the filamentary mesh-structured chocolate out of the mold. The mold filamentary mesh-structured chocolate has a strength which makes the chocolate free from deformation, fracture or cracking even the above novel filamentary mesh-structured chocolate has a sufficiently large ratio in volume of the internal three-dimensional space to the chocolate material straight filaments for providing a light taste and a light feeling in the mouth.

BRIEF DESCRIPTION OF THE DRAWING

FIG. 1 is a schematic perspective view of an example of the molded filamentary mesh-like structured chocolate according to the present invention.

DETAILED DESCRIPTIONS OF THE INVENTION

In accordance with the present invention provides a novel filamentary mesh-structured chocolate comprising multi-level parallel-extending multi-filament structured layers, each of which further comprises a plurality of chocolate material straight filaments extending in parallel to each other to form a parallel-extending multi-filament structured layer, wherein adjacent two different level layers of the multilevel filament-structured layers are different from each other in direction along which the chocolate material straight filaments extend so that each of the chocolate material straight filaments of upper level one of the adjacent two different level layers is point-contacted with and crosses each of the chocolate material straight filaments of lower level one of the adjacent two different level layers, thereby forming a three-dimensional internal space defined by the chocolate material straight filaments. The pitch of the chocolate material straight filaments in the same level layer may either be variable or preferably substantially constant or regular.

It is also preferable that alternatively different level layers of the multilevel filament-structured layers are identical with each other in direction along which the chocolate material straight filaments extend.

The above novel filamentary mesh-structured chocolate has a large fracture strength which makes the chocolate free from a deformation, fracture or cracking even the above novel filamentary mesh-structured chocolate has a sufficiently large ratio in volume of the internal three-dimensional space to the chocolate material straight filaments for providing a light taste and a light feeling in the mouth.

As described above, it is important for the present invention to prevent the chocolate material straight filaments from being united with each other due to deformations thereof and also keep the above three-dimensional straight-filament mesh structure forming the sufficiently large internal three-dimensional space for providing a light taste and a light feeling in the mouth, an emulsifier may be used for the chocolate material, wherein the emulsifier is added at 0.3–5 wt %, preferably 1–3 wt % based on the total weight of the chocolate material, and the emulsifier comprises at least one selected from the group consisting of sorbitan-tristearate, sorbitan-trioleate, sorbitan-monooleate, hexaglycerol-monostearate and decaglycerol-monooleate. Optionally, it is also effective to use the above emulsifier at 0.3–5 wt %, preferably 1–3 wt % in combination with lecithin for the chocolate material.

The present invention also provides a method of producing the above novel filamentary mesh-structured chocolate. A chocolate material is prepared which includes, with or without lecithin, an emulsifier at 0.3–5 wt %, preferably 1–3 wt % based on the total weight of the chocolate material, wherein the emulsifier comprises at least one selected from the group consisting of sorbitan-tristearate, sorbitan-trioleate, sorbitan-monooleate, hexaglycerol-monostearate and decaglycerol-monooleate. A depositor having a plurality of extrusion nozzles is moved in a straight line in a first direction in relation to a mold together with extrusions of the chocolate material from the extrusion nozzles so that a plurality of first level chocolate material straight filaments extending over the mold in parallel to each other and in the first direction to form a first level parallel-extending multi-filament structured layer, and subsequently the depositor is then moved in a straight line in a second direction which is different from the first direction by an angle in the range of more than 0 degree to less than 180 degrees with further extrusions of the chocolate material from the extrusion nozzles so that a plurality of second level chocolate material straight filaments extending in parallel to each other and in the second direction to form a second level parallel-extending multi-filament structured layer over the first level parallel-extending multi-filament structured layer, wherein each of the second level chocolate material straight filaments is point-contacted with and crosses each of the first level chocolate material straight filaments. The above operations will repeat to fill the mold with multilevel parallel-extending multi-filament structured layers thereby forming a three-dimensional internal space defined by the chocolate material straight filaments, before cooling the mold to bring the filamentary mesh-structured chocolate out of the mold. The mold filamentary mesh-structured chocolate has a strength which makes the chocolate free from deformation, fracture or cracking even the above novel filamentary mesh-structured chocolate has a sufficiently large ratio in volume of an internal three-dimensional space to the chocolate material straight filaments for providing a light taste and a light feeling in the mouth.

It is preferable that each of the upper level chocolate material straight filaments is point-contacted with and crosses each of the lower level chocolate material straight filaments at an angle in the range of not less than 30 degrees to not more than 150 degrees. If the angle is less than 30 degrees, then it is difficult to form a sufficiently large ratio in volume of an internal three-dimensional space to the chocolate material straight filaments for providing a light taste and a light feeling in the mouth. If the angle is more than 150 degrees, then a fracture strength or a deformation strength of the chocolate are deteriorated.

It is preferable that each of the chocolate material straight filaments has a diameter in the range of 0.5–3 millimeters in order to obtain both a high fracture strength and a high deformation strength of the chocolate and a sufficiently large ratio in volume of an internal three-dimensional space to the chocolate material straight filaments for providing a light taste and a light feeling in the mouth. If the diameter of the chocolate material straight filament is less than 0.5 millimeters, then it is difficult to obtain a high fracture strength and a high deformation strength of the chocolate. If the diameter of the chocolate material straight filament is more than 3 millimeters, then it is difficult to obtain a sufficiently large ratio in volume of an internal three-dimensional space to the chocolate material straight filaments for providing a light taste and a light feeling in the mouth.

The number of the multilevel level parallel-extending multi-filament structured layers may be decided in consideration of the light taste and the light feeling in the mouth, the shape of the chocolate product and a volume of the mold. For example, ten to fourteen multilevel level parallel-extending multi-filament structured layers may be laminated.

Further, the novel filamentary mesh-structured chocolate may optionally comprise plural sets of first and second level parallel-extending multi-filament structured layers, wherein the first level parallel-extending multi-filament structured layer further comprises a plurality of first level chocolate material straight filaments extending in parallel to each other and in a first direction, whilst the second level parallel-extending multi-filament structured layer further comprises a plurality of second level chocolate material straight filaments extending in parallel to each other and in a second direction, so that each of the second level chocolate material straight filaments is point-contacted with and crosses each of the first level chocolate material straight filaments.

Further more, the novel filamentary mesh-structured chocolate may optionally comprise plural sets of first, second and third level parallel-extending multi-filament structured layers, wherein the first level parallel-extending multi-filament structured layer further comprises a plurality of first level chocolate material straight filaments extending in parallel to each other and in a first direction, and the second level parallel-extending multi-filament structured layer further comprises a plurality of second level chocolate material straight filaments extending in parallel to each other and in a second direction so that each of the second level chocolate material straight filaments is point-contacted with and crosses each of the first level chocolate material straight filaments at an angle in the range of 30–150 degrees, and the third level parallel-extending multi-filament structured layer further comprises a plurality of third level chocolate material straight filaments extending in parallel to each other and in a third direction so that each of the third level chocolate material straight filaments is point-contacted with and crosses each of the second level chocolate material straight filaments at an angle in the range of 30–150 degrees.

As described above, in accordance with the present invention the depositor having a plurality of extrusion nozzles is moved in a straight line in a first direction in relation to a mold together with extrusions of the chocolate material from the extrusion nozzles so that a plurality of first level chocolate material straight filaments extending over the mold in parallel to each other and in the first direction to form a first level parallel-extending multi-filament structured layer, and subsequently the depositor is then moved in a straight line in a second direction which is different from the first direction by an angle in the range of more than 0 degree to less than 180 degrees with further extrusions of the chocolate material from the extrusion nozzles so that a plurality of second level chocolate material straight filaments extending in parallel to each other and in the second direction to form a second level parallel-extending multi-filament structured layer over the first level parallel-extending multi-filament structured layer, wherein each of the second level chocolate material straight filaments is point-contacted with and crosses each of the first level chocolate material straight filaments. The above operations will repeat to fill the mold with multilevel parallel-extending multi-filament structured layers thereby forming a three-dimensional internal space defined by the chocolate material straight filaments, before cooling the mold to bring the filamentary mesh-structured chocolate out of the mold. The mold filamentary mesh-structured chocolate has a strength which makes the chocolate free from deformation, fracture or cracking even the above novel filamentary mesh-structured chocolate has a sufficiently large ratio in volume of an internal three-dimensional space to the chocolate material straight filaments for providing a light taste and a light feeling in the mouth. The chocolate material straight filaments are required to have a high stability in shape to prevent deformation until the cooling the mold.

If a temperature of the depositor is controlled so as to provide the extruded chocolate material straight filaments with the required high stability in shape to prevent deformation until the cooling the mold, then a chocolate material in the depositor is likely to be solidified without extrusion from the extrusion nozzle or likely to block the extrusion nozzles, whereby it is no longer possible to realize efficient and continuous productions of the chocolates.

Alternatively, if contents of fats and/or emulsifier in the chocolate material are reduced or a water is added into the chocolate material, then the chocolate has a poor melting property in mouth, resulting in a problem in quality of the chocolate.

Therefore, in accordance with the present invention, the chocolate material includes, with or without lecithin, an emulsifier at 0.3–5 wt %, preferably 1–3 wt % based on the total weight of the chocolate material, wherein the emulsifier comprises at least one selected from the group consisting of sorbitan-tristcarate, sorbitan-trioleate, sorbitan-monooleate, hexaglycerol-monostearate and decaglycerol-monooleate, whereby yield value of the chocolate material filaments in extrusion from the extrusion nozzles is increased and the stability in shape of the extruded chocolate material filaments is also increased. In accordance with the present invention, the emulsifier is used in order to increase the yield value, whilst in the prior art the emulsifier has been used to decrease the yield value. In accordance with the present invention, a content of the emulsifier is not less than 0.3 wt % which is much higher than the normal contact of emulsifier of the prior art. A content of lecithin is in the range of 0.1–5 wt % of the chocolate to reduce a viscosity of the chocolate material for prevention of solidification of the chocolate material in the depositor or blocking the extrusion nozzles.

As described above, each of the upper level chocolate material straight filaments is point-contacted with and crosses each of the lower level chocolate material straight filaments at an angle in the range of not less than 30 degrees to not more than 150 degrees thereby to obtain a sufficiently large ratio of an internal three-dimensional space to a total volume of the chocolate in the range of 40–60% for providing a light taste and a light feeling in the mouth.

The molded mesh-like filamentary chocolate according to the present invention may optionally contain nuts such as almonds, peanuts, baked confectioneries such as biscuits and wafers, pasty fillers such as creams and nut pastes to provide a variety of chocolate products, so that consumers enjoy various tastes and flavors.

Since the molded mesh-like filamentary chocolate according to the present invention is shaped in a mold, there is no limitation to shape of the chocolate.

EXAMPLES

The present invention will be explained specifically by way of examples which are not intended to restrict the invention. In the Examples, parts means parts-by-weight unless otherwise specified.

Example 1

A chocolate material was prepared according to a conventional method by mixing 20 parts of cacao mass, 20 parts of whole powdered milk, 20 parts of cocoa butter, 40 parts of sugar, 2 parts of sorbitan-tristearate and 0.1 part of vanilla essence. After tempering and then adjusting the temperature thereof to 29° C., the chocolate material was extruded into a mold by means of a linearly moving depositor equipped with sixty nozzles (1 mm in inner diameter) arranged in parallel to one another at 2.5 mm intervals with the tops of the nozzles aligning, to give sixty chocolate filaments arranged parallel to one another in the mold. Then the direction of the linear movement (namely, machine direction) of the depositor was changed by 30 degrees, and similarly the chocolate material was extruded from the nozzles into the mold to give a mesh-like chocolate layer. After returning the machine direction of the depositor to the initial state, the same operation was repeated six times in total to fill the mold with the chocolate filaments. After cooling the content in the mold, it was removed from the mold to give a molded mesh-like structured filamentary chocolate in which six layers of mesh-like structure (12 chocolate filament layers) are piled up.

The molded chocolate thus obtained had a high shape retention in which each filament in one layer contact the filaments in the adjacent layer only at some points and was not fused to the other filaments. Thus, the molded chocolate had a high internal void space and a light taste which had not been attained by the conventional chocolate products.

Example 2

Using as a chocolate material 20 parts of cacao mass, 20 parts of whole powdered milk, 20 parts of cocoa butter, 40 parts of sugar, 2 parts of sorbitan-trioleate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 3

Using as a chocolate material 20 parts of cacao mass, 20 parts of whole powdered milk, 20 parts of cocoa butter, 40 parts of sugar, 2 parts of sorbitan-monooleate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 4

Using as a chocolate material 20 parts of cacao mass, 20 parts of whole powdered milk, 20 parts of cocoa butter, 40 parts of sugar, 2 parts of hexaglycerol-monostearate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 5

Using as a chocolate material 20 parts of cacao mass, 20 parts of whole powdered milk, 20 parts of cocoa butter, 40 parts of sugar, 2 parts of decaglycerol-monooleate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 6

Using as a chocolate material 20 parts of cacao mass, 20 parts of whole powdered milk, 20 parts of cocoa butter, 40 parts of sugar, 1 part of sorbitan-tristearate, 1 part of sorbitan-monooleate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 7

Using as a chocolate material 20 parts of cacao mass, 20 parts of whole powdered milk, 20 parts of cocoa butter, 40 parts of sugar, 1 part of sorbitan-tristearate, 1 part of hexaglycerol-monostearate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 8

Using as a chocolate material 20 parts of cacao mass, 20 parts of whole powdered milk, 20 parts of cocoa butter, 40 parts of sugar, 2 parts of sorbitan-tristearate, 0.3 parts of lecithin and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Example 9

Using as a chocolate material 20 parts of cacao mass, 20 parts of whole powdered milk, 20 parts of cocoa butter, 40 parts of sugar, 1 part of sorbitan-tristearate, 1 part of hexaglycerol-monostearate and 0.1 part of vanilla essence, the procedures similar to those in Example 1 were repeated.

The resulting molded chocolate had a high shape retention in which each filament in one layer contacts the filaments in the adjacent layer only at points and was not fused to the other filaments. Thus, the chocolate had a high internal void space and had a light taste which had not been attained by the conventional chocolate products.

Comparative Example 1

Using as a chocolate material 20 parts of cacao mass, 20 parts of whole powdered milk, 20 parts of cocoa butter, 40 parts of sugar, 0.3 parts of lecithin and 0.1 part of vanilla essence, the procedures similar to those in Example 1 were repeated.

The resulting molded chocolate had a low shape retention and the chocolate filaments in the mold were fused to one another to give a low internal void space. Thus, the chocolate had a taste similar to that of conventional chocolate products.

Comparative Example 2

Using as a chocolate material 20 parts of cacao mass, 20 parts of whole powdered milk, 20 parts of cocoa butter, 40 parts of sugar, 0.3 parts of polyglycerol-polyricinoleate and 0.1 part of vanilla essence, the procedures similar to those in Example 1 were repeated.

The resulting molded chocolate had a low shape retention and the chocolate filaments in the mold were fused to one another to give a low internal void space. Thus, the chocolate had a taste similar to that of conventional chocolate products.

Comparative Example 3

Using as a chocolate material 20 parts of cacao mass, 20 parts of whole powdered milk, 20 parts of cocoa butter, 40 parts of sugar, 0.2 parts of sorbitan-tristearate and 0.1 part of vanilla essence, the procedures similar to those in Example 1 were repeated.

The resulting molded chocolate had a low shape retention and the chocolate filaments in the mold were fused to one another to give a low internal void space. Thus, the chocolate had a taste similar to that of conventional chocolate products.

Comparative Example 4

Using as a chocolate material 20 parts of cacao mass, 20 parts of whole powdered milk, 20 parts of cocoa butter, 40 parts of sugar, 6 parts of sorbitan-tristearate, 0.3 part of lecithin and 0.1 part of vanilla essence, the procedures similar to those in Example 1 were repeated.

The resulting molded chocolate had a high shape retention and a high internal void space. However, the nozzles were liable to clog, and thus it was difficult to produce the molded chocolate efficiently.

EXAMINATIONS

The molded chocolates produced in Examples 1–9 and Comparative Examples 1–4 were measured with regard to yield value, viscosity, operability, internal space volume ratio and shape or configuration according to the following methods.

Examination 1: Measurement of Yield Value

Using a concentric cylinder-method viscometer REO-MAT 30 commercially available from Contravas Corp., shear velocity (S) and shear stress (D) of a chocolate material adjusted to 40° C. were measured. A Casson flow curve was prepared by plotting the square root of each value of the resulting data. The measured values S and D were substituted into the following Casson equation to find a Casson yield value (Sc):

$$\sqrt{(S)} = \sqrt{(Sc)} + \sqrt{(\mu c)} \times \sqrt{(D)}$$

where ($\mu c$) represents a Casson viscosity.

Examination 2: Measurement of Viscosity

Adjusting the temperature of a chocolate material to 40° C., viscosity was measured at 6 rpm with a No. 4 rotor and B type Viscometer (Model BM) commercially available from Tokyo Keiki Sangyo K. K.

Examination 3: Measurement of Operability

Using the same nozzle as used in the examples, a time duration until blocking of the nozzle during successive extrusion of the chocolate material was measured and operability of the material was evaluated according to the following evaluation standards.

1: no blocking to the nozzle is occurred during successive extrusion for more than 10 hours.
2: the blocking is occurred after 5 to 10 hours.
3: the blocking is occurred after 1 to 5 hours.
4: the blocking is occurred within 1 hour.
5: the blocking is occurred within 10 minutes.

Examination 4: Measurement of Internal Space Volume

Internal space volume ratio of the chocolate product was calculated according to the following formula:

Internal space volume ratio $(R) = (1 - R1/R2) \times 100$ where R1 is the volume of the chocolate material filaments which is calculated by dividing a weight of the molded chocolate product with a specific gravity of the chocolate (1.25); and R2 is the volume of the mold (70 cc).

Examination 5: Shape of Chocolate

The shape of the molded filamentary chocolate product was visually observed and evaluated according to the following standards:

1: chocolate filaments have point-contact with each other to form a large internal space.
2: chocolate filaments are adhered with one another due to a light fusion whereby a small internal space is formed.
3: chocolate filaments are heavily fused with one another whereby a small internal space is formed.
4: chocolate filaments are almost united with one another to form almost no internal space.
5: chocolate filaments are completely united with one another to form no internal space.

The results of the above Examiners 1–5 are shown on the following Table 1.

TABLE 1

| | yield value (dyn/cm2) | viscosity (poise) | operability | void volume (%) | shape |
|---|---|---|---|---|---|
| Example 1 | 530 | 605 | 2 | 65 | 1 |
| Example 2 | 540 | 630 | 3 | 61 | 1 |
| Example 3 | 520 | 600 | 3 | 55 | 1 |
| Example 4 | 500 | 580 | 2 | 55 | 1 |
| Example 5 | 495 | 590 | 2 | 55 | 1 |
| Example 6 | 510 | 605 | 2 | 60 | 1 |
| Example 7 | 530 | 620 | 3 | 60 | 1 |
| Example 8 | 350 | 450 | 1 | 56 | 1 |
| Example 9 | 330 | 350 | 1 | 50 | 1 |
| Com. Ex. 1 | 260 | 305 | 1 | 10 | 4 |
| Com. Ex. 2 | 150 | 180 | 1 | 4 | 5 |
| Com. Ex. 3 | 218 | 250 | 2 | 30 | 3 |
| Com. Ex. 4 | 720 | 820 | 4 | 65 | 1 |

In the chocolate products of Examples 1–9 according to the present invention, a plural number of parallel chocolate filaments in each layer are point-contacted with and cross a plural number of parallel chocolate filaments in the adjacent layer to form an angle, thereby providing a large internal space in the chocolate product. Particularly in Examples 8 and 9, no blocking to the nozzles was occurred during extrusion of the chocolate materials and thus successive and efficient mass-production of chocolates can be realized. Moreover, the chocolate products in these examples had a high internal space ratio.

According to the present invention, it is possible to produce a molded filamentary mesh-like structured chocolate having a high stability in shape and a high internal space ratio to provide a light taste, because the chocolate filaments have point contact with each other without fusion together.

What is claimed is:

1. A chocolate having a filamentary mesh-like structure which comprises multilevel parallel-extending multi-filament structured layers, each of which further comprises a plurality of chocolate material straight filaments extending substantially in parallel to each other, wherein adjacent two different level layers of the multilevel parallel-extending multi-filament structured layers are different from each other in direction along which the chocolate material straight filaments extend so that each of the chocolate material straight filaments of upper level one of the adjacent two different level layers is point-contacted with and crosses each of the chocolate material straight filaments of lower level one of the adjacent two different level layers, so as to form a three-dimensional internal space defined by the chocolate material straight filaments;

wherein the chocolate material straight filaments are made of a chocolate material including an emulsifier at 1.95–5 wt % based on a total weight of the chocolate.

2. The chocolate is claimed in claim 1, wherein alternatively different level layers of the multilevel parallel-extending multi-filament structured layers are identical with each other in direction along which the chocolate material straight filaments extend.

3. The chocolate as claimed in claim 1, wherein the emulsifier comprises at least one selected from the group consisting of sorbitan-tristearate, sorbitan-trioleate, sorbitan-monooleate, hexaglycerol-monostearate and decaglycerol-monooleate.

4. The chocolate as claimed in claim 3, wherein the chocolate material includes the emulsifier at 1.95–3 wt % based on the total weight of the chocolate.

5. The chocolate as claimed in claim 4, wherein the chocolate material further includes lecithin.

6. The chocolate as claimed in claim 1, wherein each of the chocolate material straight filaments of upper level one of the adjacent two different level layers is point-contacted with and crosses each of the chocolate material straight filaments of lower level one of the adjacent two different level layers at an angle in the range of not less than 30 degrees to not more than 150 degrees.

7. The chocolate as claimed in claim 1, wherein each of the chocolate material straight filaments has a diameter in the range of 0.5–3 millimeters.

8. The chocolate as claimed in claim 1, wherein a ratio of an internal three-dimensional space to a total volume of the chocolate is in the range of 40–60%.

9. A method of producing a chocolate having a filamentary mesh-like structure, said method comprising the steps of:

providing a chocolate material including an emulsifier at 1.95–5 wt % based on a total weight of the chocolate;

moving in a straight line a depositor having a plurality of extrusion nozzles in a first direction in relation to a mold together with extrusions of the chocolate material from the extrusion nozzles so that a plurality of first level chocolate material straight filaments extend over the mold in parallel to each other and in the first direction to form a first level parallel-extending multi-filament structured layer;

moving in a straight line the depositor in a second direction which is different from the first direction with further extrusions of the chocolate material from the extrusion nozzles so that a plurality of second level chocolate material straight filaments extend in parallel to each other and in the second direction to form a second level parallel-extending multi-filament structured layer over the first level parallel-extending multi-filament structured layer, wherein each of the second level chocolate material straight filaments is point-contacted with and crosses each of the first level chocolate material straight filaments, thereby forming a three-dimensional internal space defined by the chocolate material straight filaments; and repeating said steps of depositing the filaments in the first and second directions.

10. The method as claimed in claim 9, wherein directions of movement of said depositor are so changed that alternatively different level layers of the multilevel parallel-extending multi-filament structured layers are identical with each other in direction along which the chocolate material straight filaments extend.

11. The method as claimed in claim 9, wherein the chocolate material includes an emulsifier at 0.3–5 wt % based on a total weight of the chocolate, and the emulsifier comprises at least one selected from the group consisting of sorbitan-tristearate, sorbitan-trioleate, sorbitan-monooleate, hexaglycerol-monostearate and decaglycerol-monooleate.

12. The method as claimed in claim 11, wherein the chocolate material includes the emulsifier at 1.95–3 wt % based on the total weight of the chocolate.

13. The method as claimed in claim 12, wherein the chocolate material further includes lecithin.

14. The method as claimed in claim 9, wherein directions of movement of said depositor are so changed that each of the chocolate material straight filaments of upper level one of the adjacent two different level layers crosses each of the chocolate material straight filaments of lower level one of the adjacent two different level layers at an angle in the range of not less than 30 degrees to not more than 150 degrees.

15. The method as claimed in claim 9, wherein the depositor having the extrusion nozzles having an internal diameter in the range of 0.5–3 millimeters is used for extrusion of the chocolate material.

\* \* \* \* \*